United States Patent [19]

Takagi et al.

[11] Patent Number: 4,824,128

[45] Date of Patent: Apr. 25, 1989

[54] TRACTOR TRANSMISSION

[75] Inventors: Masao Takagi, Hasimoto; Masayoshi Miyahara, Sakai; Nobuyuki Toshikuni, Neyagawa, all of Japan

[73] Assignee: Kubota, Ltd., Osaka, Japan

[21] Appl. No.: 43,724

[22] Filed: Apr. 29, 1987

[30] Foreign Application Priority Data

Nov. 22, 1986 [JP] Japan ................................ 61-279233
Nov. 25, 1986 [JP] Japan ........................... 61-181617[U]
Dec. 22, 1986 [JP] Japan ........................... 61-197167[U]
Feb. 26, 1987 [JP] Japan .................................. 62-44398

[51] Int. Cl.⁴ ............................................ B60K 17/28
[52] U.S. Cl. .................................... 180/53.1; 74/15.4; 74/15.84; 180/75.1
[58] Field of Search ...................... 180/75.1, 53.1, 233, 180/247; 74/15.4, 15.63, 15.84, 15.88, 360, 359, 745, 665 GA, 665 GC

[56] References Cited

U.S. PATENT DOCUMENTS 3,916,714 11/1975 Sisson et al. .......................... 74/360
4,294,130 10/1981 Kisaka et al. ........................ 74/15.4

FOREIGN PATENT DOCUMENTS 547764 11/1959 Belgium ............................. 180/75.1
0173643 10/1982 Japan .................................. 74/15.84

Primary Examiner—Charles A. Marmor
Assistant Examiner—Karin Tyson
Attorney, Agent, or Firm—Edwin E. Greigg

[57] ABSTRACT

A transmission for a tractor comprising a power takeoff line change speed gear mechanism, propelling line change speed gear mechanisms and a backward and forward drive switching mechanism. The propelling line change speed gear mechanisms include a main change speed mechanism, an auxiliary change speed mechanism and a front wheel change speed mechanism. The power takeoff line change speed mechanism, and the main and auxiliary change speed mechanisms somewhat encircle a longitudinal center line transversely of the transmission. The backward and forward drive switching mechanism and the front wheel change speed mechansim are juxtaposed in a region immediately forwardly of the change speed machanisms B, C and E. Further, the drive switching mechanism, the auxiliary change speed mechanism and the front wheel change speed mechanism F are disposed on one lateral side of a longitudinal plane from a front end of the tractor to a rear end at a substantially mid-position of the transmission while the power takeoff line change speed mechanism and the main change speed mechanism are disposed on the other lateral side thereof.

12 Claims, 9 Drawing Sheets

TRACTOR TRANSMISSION

BACKGROUND OF THE INVENTION (1) Field of the Invention

The present invention relates to a tractor transmission including a plurality of change speed gear mechanisms, and to a tractor equipped with such a transmission.

(2) Description of the Prior Art

A known tractor transmission including a plurality of change speed gear mechanisms is disclosed, for example, in U.S. Pat. No. 4,628,768. As exemplified by this disclosure, the known transmission invariably includes clutch means, a backward and forward drive switching mechanism, a main change speed gear mechanism, and an auxiliary change speed gear mechanism interconnected in series longitudinally of the tractor. There is a limit to reduction in longitudinal dimensions of such a transmission by reason of its structural conditions. A proposal has been made as disclosed in U.S. Pat. No. 4,513,834, to reduce the longitudinal dimensions of the transmission. According to this proposal, an engine drive is input to a hydraulic stepless change speed mechanism through clutch means, and an output of the hydraulic stepless change speed mechanism is transmitted to the rear wheels through a vertical reduction mechanism. The stepless change speed mechanism may reduce the longitudinal dimensions of the transmission but requires a considerable space in the vertical direction. Furthermore, it is only in limited cases from the point of view of transmission efficiency and cost that the stepless change speed mechanism is employed in favor of a gear type change speed mechanism.

SUMMARY OF THE INVENTION

A primary object of the present invention is to provide a rational improvement in a transmission including a plurality of change speed gear mechanisms, thereby to achieve a transmission having reduced longitudinal dimensions without increasing its vertical dimensions.

A further object of the invention is to provide a tractor equipped with a transmission having reduced dimensions as noted above, thereby to enlarge and flatten a region of the driver's feet.

These objects are achieved by juxtaposing the plurality of change speed gear mechanisms constituting a transmission transversely of the transmission.

According to the tractor equipped with the transmission of the above construction, a large space is secured forwardly and downwardly of a transmission case without lowering its level above the ground, which space is available for accommodating a mid-mount type working implement. The construction according to the invention also has the advantage of increasing longitudinal dimensions of a step for supporting the driver's feet, without raising the height of a driver's seat above the transmission case.

Other objects and advantages of the present invention will be apparent from the following description.

DESCRIPTION OF THE PREFERRED EMBODIMENTS

Figure 1:
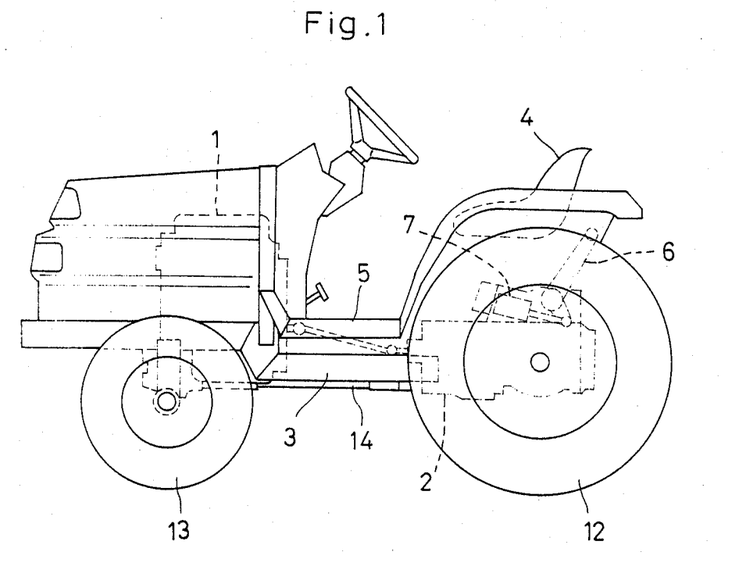
FIG. 1 is a side elevation of a tractor equipped with a transmission embodying the present invention.

Referring to FIG. 1, the tractor shown therein comprises an engine 1 disposed in a front portion thereof, a transmission case 2a disposed in a rear portion thereof and housing a transmission 2, a pair of right and left chassis frames 3 interconnecting the engine 1 and the transmission case 2a, a driver's seat 4 disposed above the transmission case 2a, and a step 5 disposed above an intermediate position of the chassis frames 3. A hydraulic cylinder 7 is mounted on the transmission case 2a for oscillating a lift arm 6 to raise and lower a working implement connected to the tractor.

Figure 2:
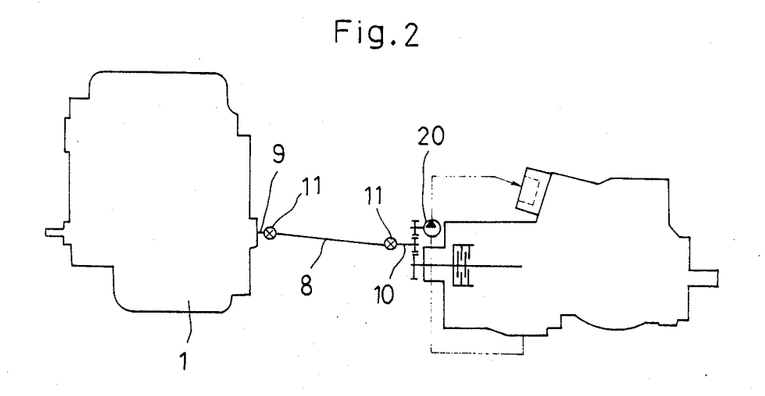
FIG. 2 is a schematic view showing an operative connection between an engine and the transmission.

Drive is transmitted from the engine 1 to the transmission 2 by means of a drive shaft 8 as shown in FIG. 2. The drive shaft 8 is connected at one end thereof to an engine output shaft 9 projecting rearwardly from the engine 1 and at the other end to an input shaft 10 of the transmission 2, both through universal joints 11. This tractor is the four wheel drive type, and the drive is transmitted to rear wheels 12 and front wheels 13 after its speed is changed at the transmission 2. The front wheels 13 receive the drive by way of a front wheel drive shaft 14 extending forwardly from the transmission 2 toward the front wheels 13.

The transmission 2 comprises a plurality of change speed gear mechanisms. As described hereinafter, these change speed gear mechanisms are arranged, to permit the entire transmission to have small dimensions longitudinally of the tractor without increasing its height, thereby to secure a large space for freedom of the driver's feet on the step 5.

Figure 3:
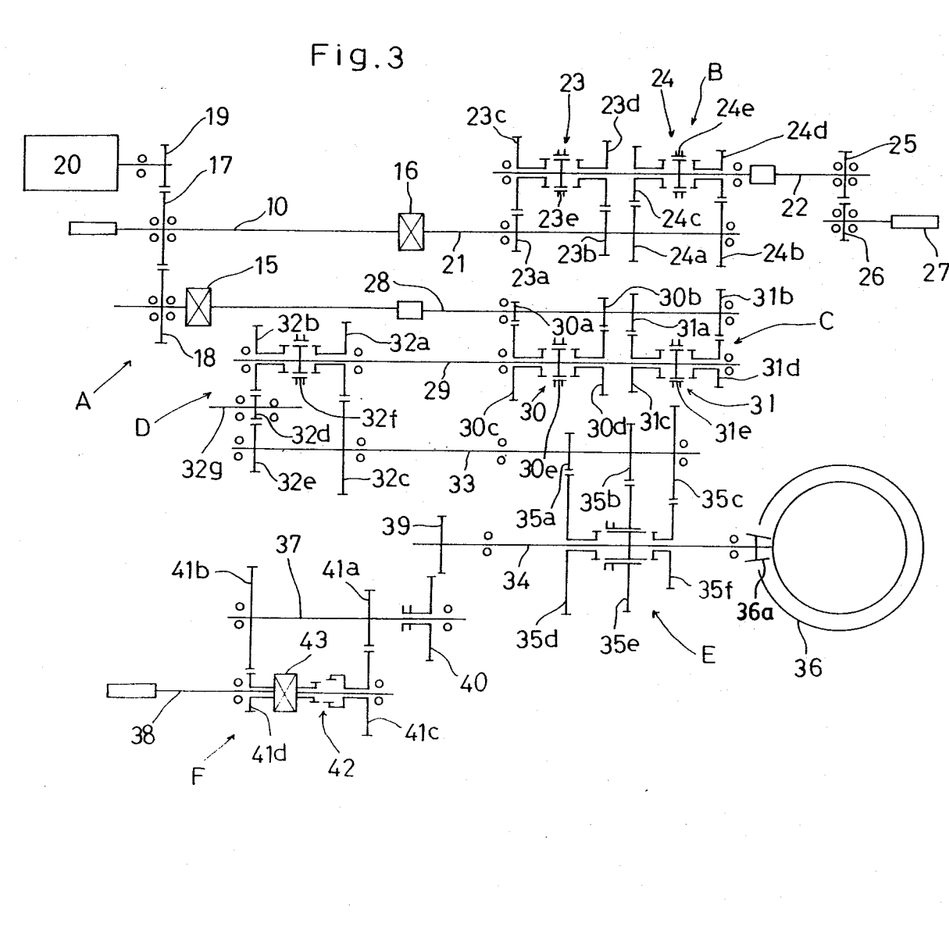
FIG. 3 is a diagram of a transmission according to a first embodiment of the invention.
Figure 4A:
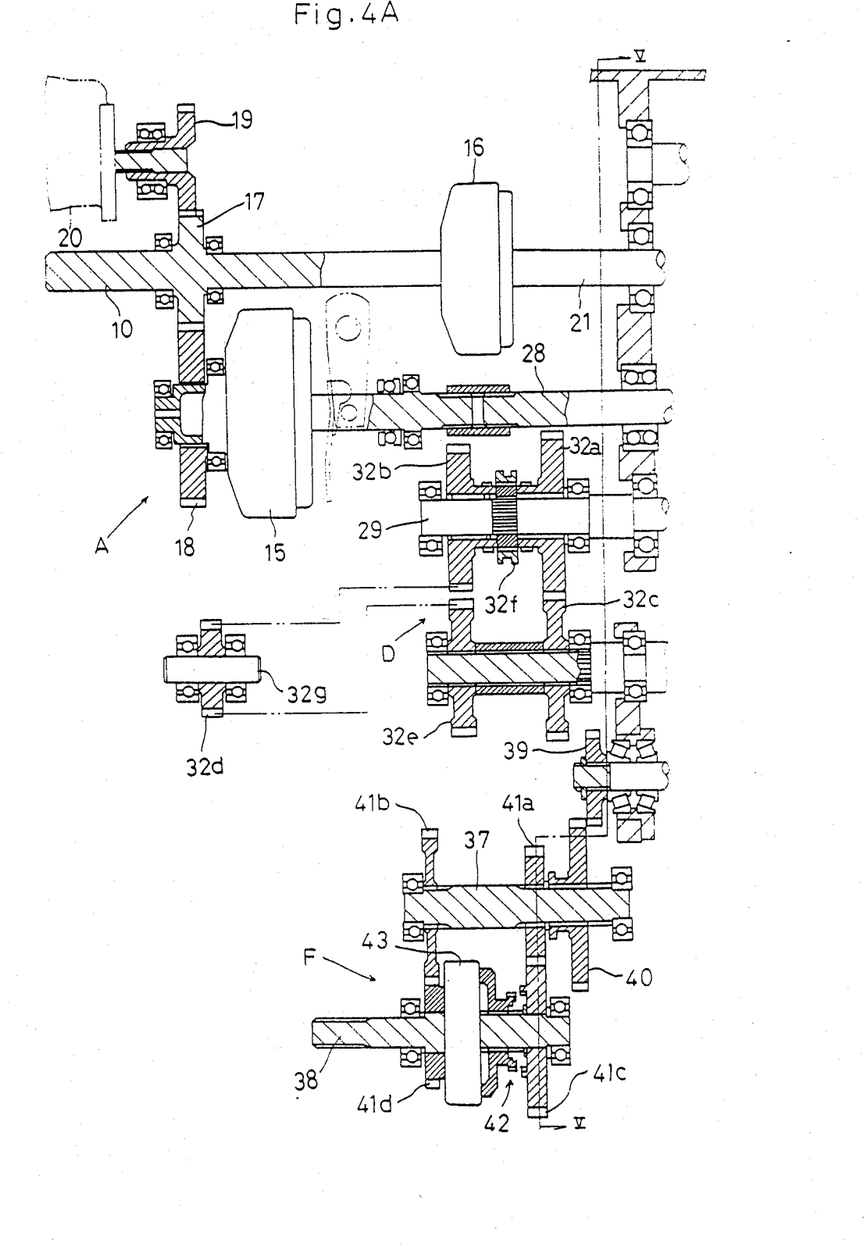
FIG. 4A is a side view, partly in section, of a forward region of the transmission according to the first embodiment.
Figure 4B:
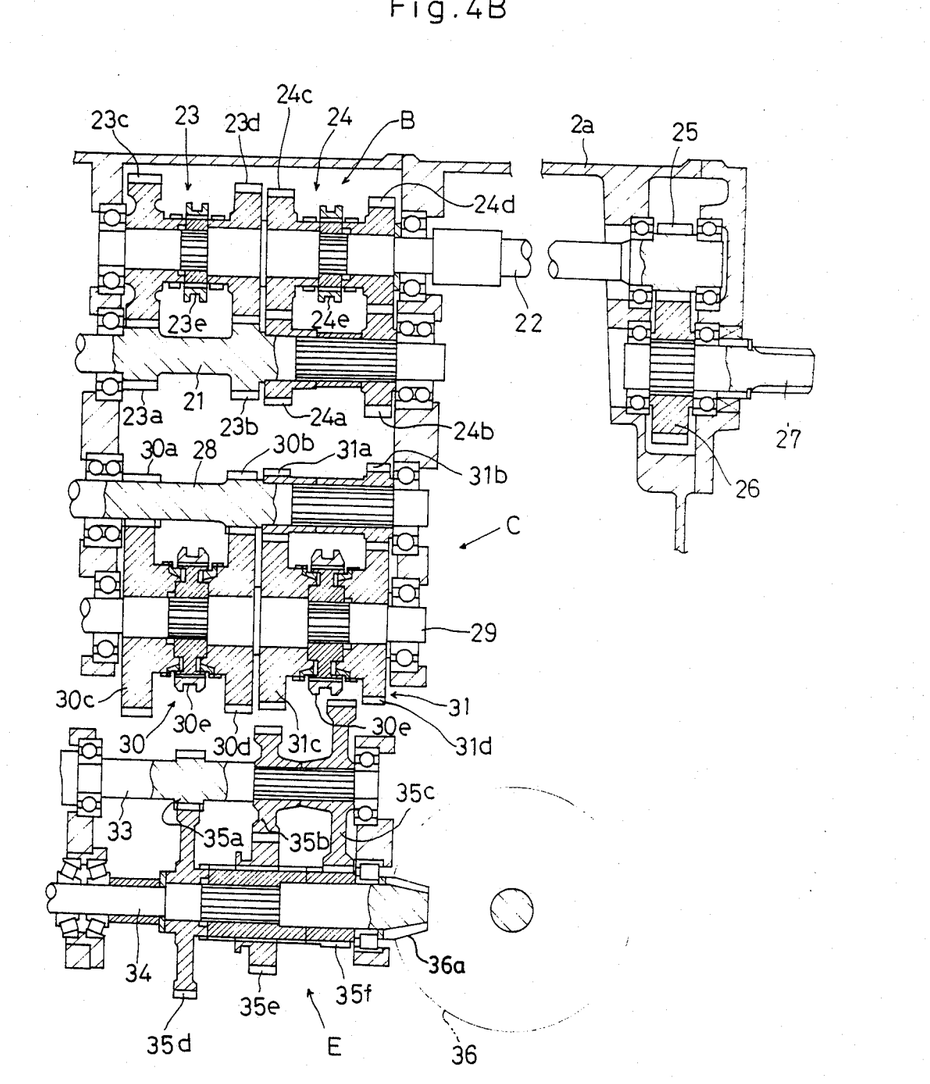
FIG. 4B is a side view, partly in section, of a rear region of the transmission according to the first embodiment.

FIG. 3 diagrammatically illustrates a transmission according to a first embodiment of the present invention, and FIGS. 4A and 4B illustrate the transmission in a longitudinal direction. This transmission comprises an input section A, a power takeoff line change speed gear mechanism B, a propelling line main change speed gear mechanism C, a backward and forward drive switching mechanism D, an auxiliary change speed gear mechanism E, and a front wheel change speed gear mechanism F. This transmission is the double clutch type, and includes a propelling line clutch 15 and a power takeoff line clutch 16 for establishing and breaking the drive transmission for the propelling line and power takeoff line separately.

The input shaft 10 is connected at one end thereof to an input end of the power takeoff line clutch 16 for transmitting the drive to the power takeoff line. The input shaft 10 carries a first input gear 17 meshed with a second input gear 18 provided on an input end of the propelling line clutch 15 for transmitting the drive to the propelling line. The first input gear 17 is meshed with a further gear 19 which is connected to a hydraulic pump 20. Thus, the input shaft 10, the propelling line clutch 15, the power takeoff line clutch 16 and the first and second input gears 17, 18 constitute the input section A of the transmission. According to this construction, the propelling line clutch 15 and the power takeoff line clutch 16 are included in the input section of the transmission disposed in the rear portion of the tractor, in contrast with the conventional construction wherein the two clutches are provided adjacent to the engine. Therefore, the described construction provides an increased space for the driver's feet on the step 5.

The power takeoff line change speed gear mechanism B includes a power takeoff line input shaft 21 connected to an output end of the power takeoff line clutch 16, and a first intermediate shaft 22 extending parallel to the power takeoff line input shaft 21. The power takeoff line input shaft 21 transmits the drive to the first intermediate shaft 22 through a first change speed gearing 23 or a second change speed gearing 24. The first change speed gearing 23 includes gears 23a and 23b mounted on the power takeoff line input shaft 21 to be rotatable in unison therewith, gears 23c and 23d mounted on the first intermediate shaft 22 to be rotatable relative thereto and meshed with the gears 23a and 23b, respectively, and a shifter 23e mounted on the first intermediate shaft 22 to be rotatable in unison therewith between the gears 23c and 23d and selectively engageable with engaging teeth defined on the gears 23c and 23d. The second change speed gearing 24 has a basic construction similar to that of the first change speed gearing 23, and includes gears 24a and 24b mounted on the power takeoff line input shaft 21, gears 24c and 24d mounted on the first intermediate shaft 22, and a shifter 24e mounted on the first intermediate shaft 22. The number of teeth is varied among the meshing pairs of gears, and the first and second change speed gearings 23, 24 together provide four speeds. Thus, the power takeoff line change speed gear mechanism B comprises the power takeoff line input shaft 21, the first intermediate shaft 22, the first change speed gearing 23 and the second change speed gearing 24. The first intermediate shaft 22 extends to a rear region of the transmission case 2a, and is connected at a rear end thereof through a pair of gears 25 and 26 to a power takeoff shaft 27 projecting from the transmission case 2a. The power takeoff shaft 27 is disposed at a mid-position transversely of the tractor.

The propelling line change speed gear mechanism C includes a propelling line input shaft 28 connected to an output end of the propelling line clutch 15, and a second intermediate shaft 29 extending parallel to the propelling line input shaft 28. The propelling line input shaft 28 transmits the drive to the second intermediate shaft 29 through a third change speed gearing 30 or a fourth change speed gearing 31. The third change speed gearing 30 includes gears 30a and 30b mounted on the propelling line input shaft 28 to be rotatable in unison therewith, gears 30c and 30d mounted on the second intermediate shaft 29 to be rotatable relative thereto and meshed with the gears 30a and 30b, respectively, and a known synchro-mesh device 30e comprising a synchronizer, a synchronizer cone and a sleeve mounted on the second intermediate shaft 29 between the gears 30c and 30d and selectively engageable with engaging teeth defined on the gears 30c and 30d. The fourth change speed gearing 31 is disposed adjacent the third change speed gearing 30 and has a basic construction similar to that of the third change speed gearing 30. The fourth change speed gearing 31 includes gears 31a and 31b mounted on the propelling line input shaft 28, gears 31c and 31d mounted on the second intermediate shaft 29, and a synchromesh device 31e mounted on the second intermediate shaft 29. The number of teeth is varied among the meshing pairs of these gears, and the third and fourth change speed gearings 30, 31 together provide four speeds. Thus, the propelling line change speed gear mechanism C comprises the propelling line input shaft 28, the second intermediate shaft 29, the third change speed gearing 30 and the fourth change speed gearing 31.

The backward and forward drive switching mechanism D includes gears 32a and 32b mounted for relative rotation on the second intermediate shaft 29 at positions closer to the propelling line clutch 15 than are the third and fourth change speed gearings 30, 31, a gear 32c meshed with the gear 32a and mounted for relative rotation on a third intermediate shaft 33 extending parallel to the second intermediate shaft 29, a gear 32e mounted for relative rotation on the third intermediate shaft 33 and meshed with the gear 32b through a reversing gear 32d mounted on a reversing shaft 32g, and a shifter 32f mounted on the second intermediate shaft 29 to be rotatable in unison therewith between the gears 32a and 32b and selectively engageable with engaging teeth defined on the gears 32a and 32b. According to this construction, the shifter 32f is movable between two engaging positions to selectively transmit the drive in forward rotation and backward rotation.

The auxiliary change speed gear mechanism E will be described next. The third intermediate shaft 33 has substantially the same length as the second intermediate shaft 29, and carries a first gear 35a, a second gear 35b and a third gear 35c mounted to be rotatable in unison therewith at positions opposite the backward and forward switching mechanism D. A differential shaft 34 is disposed parallel to the third intermediate shaft 33, and includes a differential pinion 36a at a rear end thereof constituting part of a rear differential 36. The differential shaft 34 carries a fourth gear 35d and a sixth gear 35f relatively rotatably mounted thereon and meshed with the first gear 35a and the third gear 35c, respectively. A fifth gear 35e engageable with the second gear 35b acts as a shift gear having a toothed portion and a boss portion. The tooth portion is splined to the boss portion to be axially slidable thereon, and the boss portion is fixed to the differential shaft 34. The fourth gear 35d and the sixth gear 35f also define splines corresponding to splines of the boss portion, to be connectable to the boss portion by sliding movements of the toothed portion. In other words, the third intermediate shaft 33 and the differential shaft 34 may be operatively connected to each other through one of the gear trains selected by sliding the shift gear 35e. The auxiliary change speed gear mechanism E, therefore, comprises the third intermediate shaft 33, the differential shaft 34 and the three pairs of gears mounted on the two shafts to provide three speeds. The drive output from the rear differential 36 is transmitted to the rear wheels 12 through reduction mechanisms disposed at opposite lateral sides of the transmission case 2a.

The front wheel change speed gear mechanism F is disposed in a lower forward region of the transmission case 2a, and includes a fourth intermediate shaft 37 and an output shaft 38. The front wheel change speed gear mechanism F receives the drive by way of a branching gear 39 mounted on a forward end of the differential shaft 34 and a shift gear 40 mounted on the fourth intermediate shaft 37. The fourth intermediate shaft 37 further carries gears 41a and 41b mounted to be rotatable in unison therewith, and the output shaft 38 carries gears 41c and 41d mounted to be rotatable relative thereto and meshed with the gears 41a and 41b, respectively. A claw clutch 42 is provided between the gear 41c and the output shaft 38, and a multidisk clutch 43 is provided between the gear 41d and the output shaft 38. In this embodiment, the claw clutch 42, gear 41d and multidisk clutch 43 are formed integral, and the two clutches are selectively engageable and disengageable. Accordingly, when the claw clutch 42 is engaged, the output shaft 38 is operatively connected to the fourth intermediate shaft 37 through the gears 41a and 41c. When the multidisk clutch 43 is engaged, the output shaft 38 is operatively connected to the fourth intermediate shaft 37 through the gears 41b and 41d. The gear train 41a, 41c causes the front wheels 13 to rotate at substantially the same peripheral speed as the rear wheels 12. The gear train 41b, 41d causes the front wheels 13 to rotate at a higher peripheral speed than the rear wheels 12. The drive is transmitted from the output shaft 38 to the front wheels 13 through the front wheel drive shaft 14, a front differential and a reduction mechanism. In the case of a two wheel drive tractor, only the front wheel change speed mechanism F is removed leaving the other change speed mechanisms intact.

Figure 5:
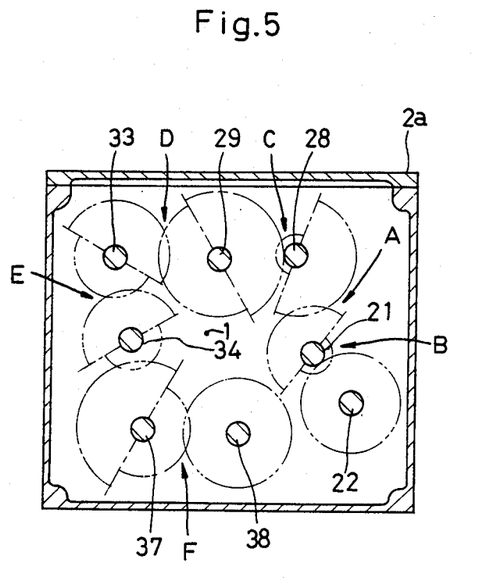
FIG. 5 is a section taken on line V—V of FIG. 4A.

The arrangement of the various change speed gear mechanisms as viewed in a transverse direction of the tractor will not be understood from the foregoing description or from FIGS. 4A and 4B showing the change speed mechanisms in developed views. FIG. 5 clearly shows the arrangement of the shafts and gears relative to a center line I of the transmission looking in a longitudinal direction of the tractor. As seen, the power takeoff line change speed gear mechanism B, the main change speed gear mechanism C and the auxiliary change speed gear mechanism E which somewhat encircle a center line I through the transmission case, whereas the backward and forward drive switching mechanism D and the front wheel change speed gear mechanism F are juxtaposed in a region immediately forwardly of the change speed mechanisms B, C and E. Further, for the interest of structural balance, the backward and forward drive switching mechanism D, the auxiliary change speed gear mechanism E and the front wheel change speed gear mechanism F are disposed on one lateral side of a longitudinal plane at a substantially mid-position of the transmission case while the power takeoff line change speed gear mechanism B and the main change speed gear mechanism C are disposed on the other lateral side thereof. This arrangement permits the transmission case 2a to have shortened longitudinal dimensions without increasing its vertical dimensions.

Figure 6:
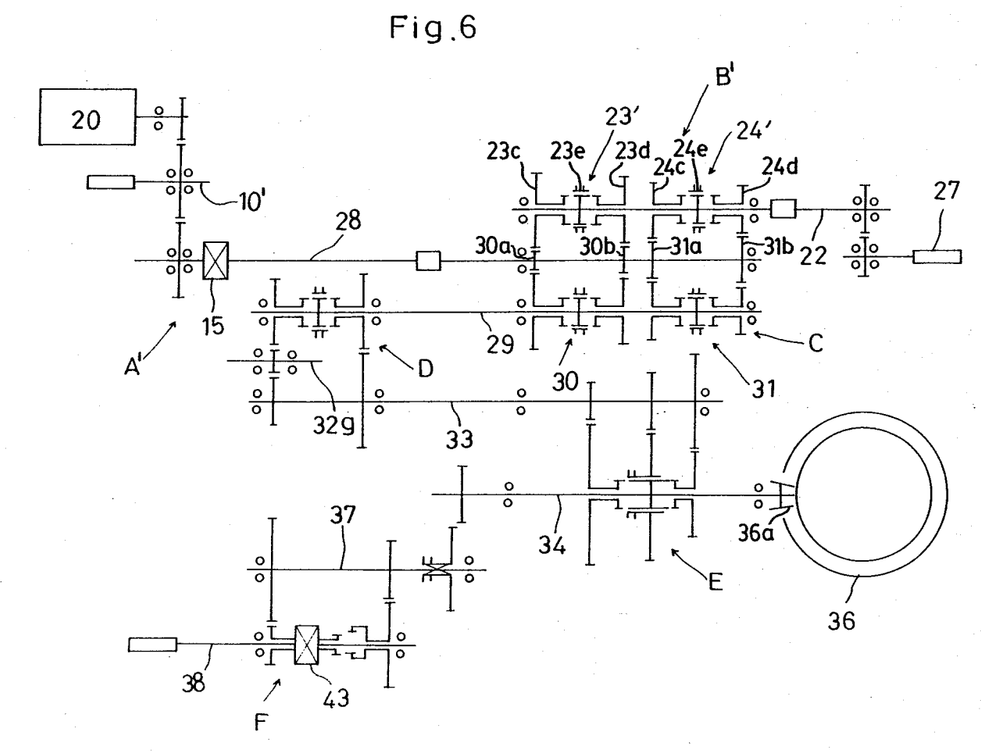
FIG. 6 is a diagram of a transmission according to a second embodiment of the invention.
Figure 7A:
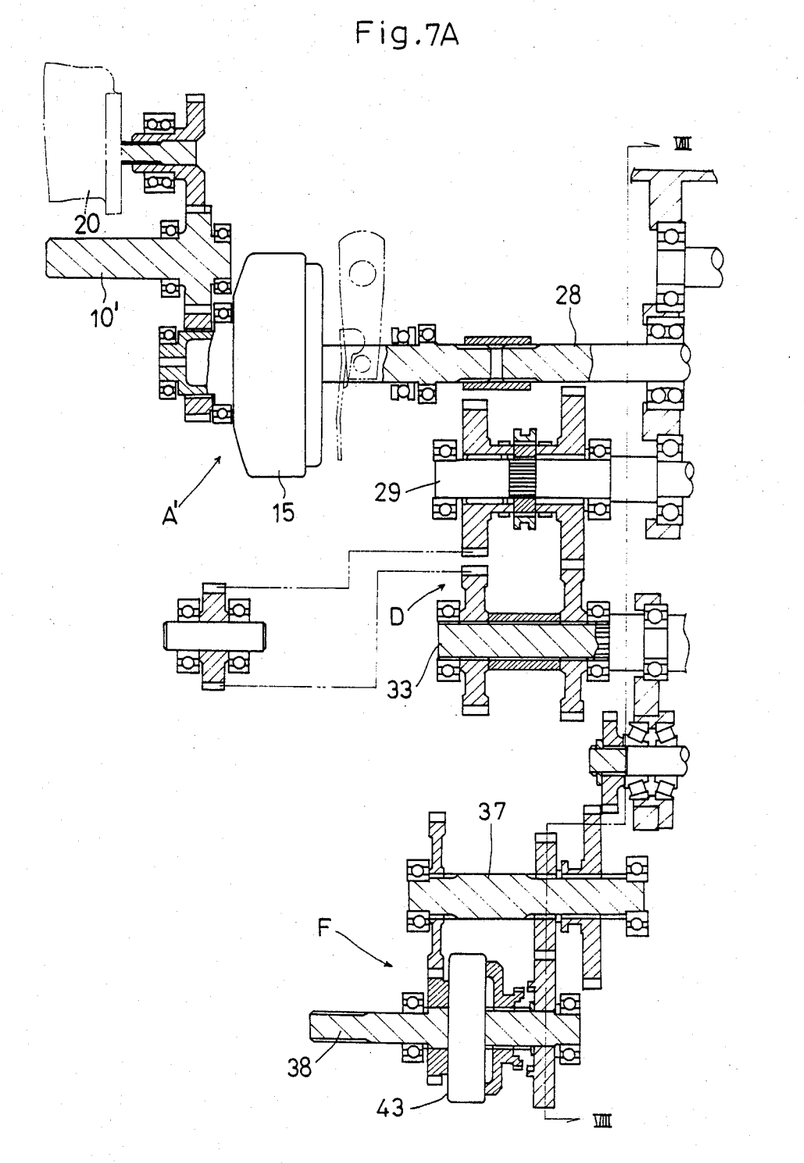
FIG. 7A is a side view, partly in section, of a forward region of the transmission according to the second embodiment.
Figure 7B:
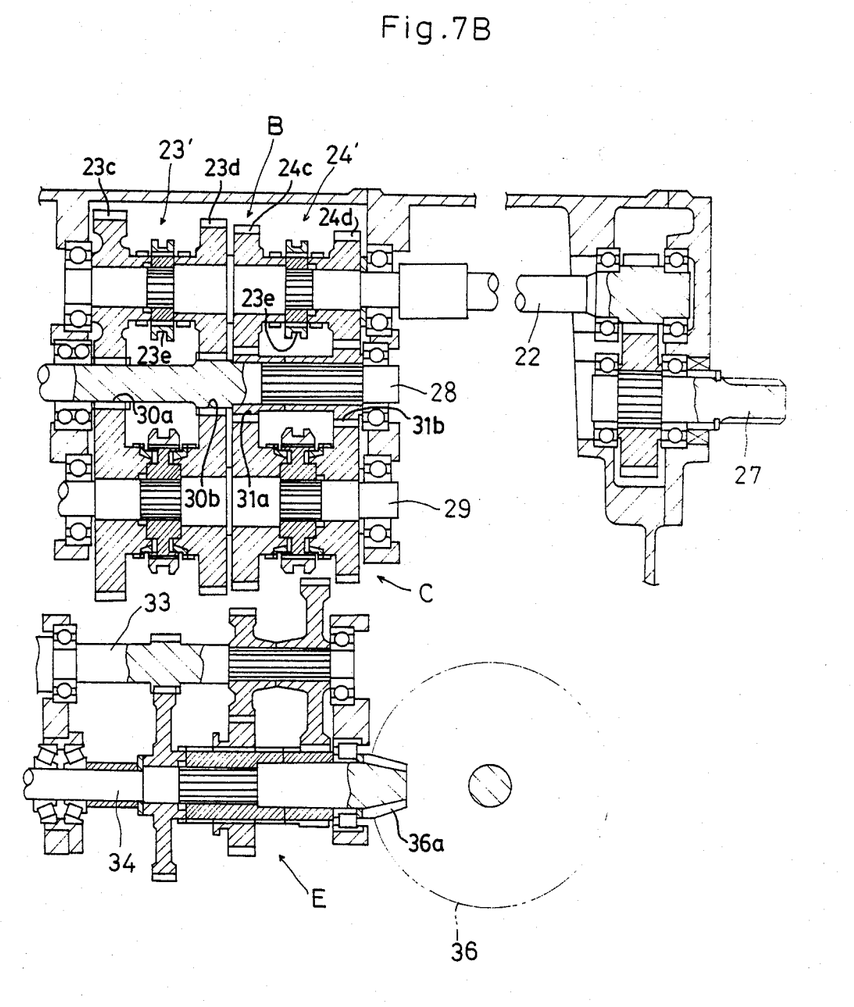
FIG. 7B is a side view, partly in section, of a rear region of the transmission according to the second embodiment.

FIGS. 7A and 7B together illustrate a single clutch type transmission without a power takeoff line clutch according to a second embodiment, wherein the drive transmission to the propelling line and the drive transmission to the power takeoff line are simultaneously established or broken by the propelling line clutch 15. The entirety of this transmission is illustrated in FIG. 6. Unlike the transmission shown in FIGS. 4A and 4B, this transmission does not include the power takeoff line input shaft or gears 23a, 23b, 24a, 24b mounted thereon, however, the propelling line input shaft 28 and gears 30a, 30b, 31a and 31b mounted thereon perform the functions of these excluded elements also. More particularly, the power takeoff line change speed gear mechanism B' comprises a first change speed gearing 23' including gears 30a and 30b mounted for unitary rotation on the propelling line input shaft 28, gears 23c and 23d mounted for relative rotation on the first intermediate shaft 22 and meshed with the gears 30a and 30b, and a shifter 23e mounted for unitary rotation on the first intermediate shaft 22 between the gears 23c and 23d and selectively engageable with engaging teeth defined on the gears 23c and 23d. The power takeoff line change speed gear mechanism B' further comprises a second change speed gearing 24' having a construction similar to that of the first change speed gearing 23' and including gears 31a and 31b mounted on the propelling line input shaft 28, gears 24c and 24d mounted on the first intermediate shaft 22 and a shifter 24e mounted on the first intermediate shaft 22. The first and second change speed gearings 23' and 24' together provide four speeds.

This transmission has an input section A' including an input shaft 10' having a reduced length and disposed at a reduced distance to the propelling line input shaft 28. This compact construction is made possible by the omission of the power takeoff line clutch. The transmission according to the second embodiment has the same construction as the transmission according to the first embodiment in the other aspects, namely the propelling line main change speed gear mechanism C, backward and forward drive switching mechanism D, auxiliary change speed gear mechanism E and front wheel change speed gear mechanism F.

Figure 8:
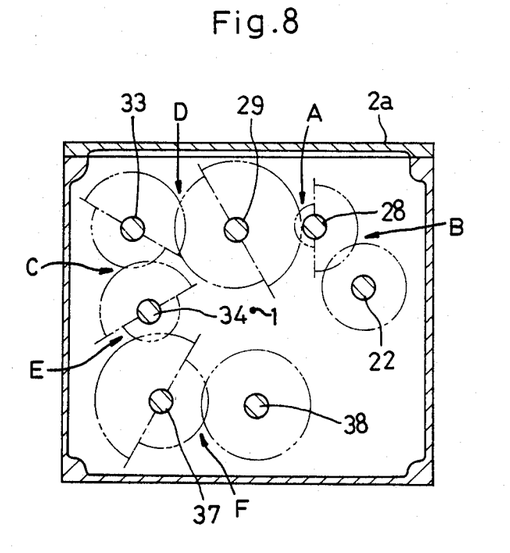
FIG. 8 is a section taken on line VIII—VIII of FIG. 7A.

FIG. 8 shows how the transmission according to the second embodiment is arranged and viewed as set forth above for FIG. 5. As in the case of the transmission according to the first embodiment, the backward and forward drive switching mechanism D, the auxiliary change speed gear mechanism E and the front wheel change speed gear mechanism F are disposed on one lateral side of a longitudinal plane at a substantially mid-position of the transmission while the power takeoff line change speed gear mechanism B' and the main change speed gear mechanism C are disposed on the other lateral side thereof.

What is claimed is:

1. A transmission for a tractor comprising a first change speed gear mechanism, and a second change speed gear mechanism for receiving a drive from the first change speed gear mechanism, wherein the first change speed gear mechanism and the second change speed gear mechanism are distributed to opposite lateral sides of a longitudinal vertical plane through a mid-position of said transmission in a direction from the front to the back of said tractor.

2. A transmission for a tractor comprising a first change speed gear mechanism for effecting change speed on a drive through a propelling line, and a second change speed gear mechanism for effecting change speed on a drive through a power takeoff line, wherein the first change speed gear mechanism and the second change speed gear mechanism are distributed to opposite lateral sides of a longitudinal vertical plane through a mid-position of said transmission in a direction from the front to the back of said tractor.

3. A transmission for a tractor comprising a first change speed gear mechanism for effecting change speed on a drive through a power takeoff line, a second change speed gear mechanism for effecting change speed on a drive through a propelling line, a third change speed gear mechanism for receiving the drive from the second change speed gear mechanism, and an input section for transmitting an engine output to the first and second change speed gear mechanisms and including clutch means to establish and break drive transmission, wherein the first change speed gear mechanism, the second change speed gear mechanism and the third change speed gear mechanism encircled a longitudinal center line of the transmission.

4. A transmission as claimed in claim 3 further comprising a backward and forward drive switching mechanism mounted in the propelling line, and a front wheel change speed gear mechanism for receiving the drive from the third change speed gear mechanism, wherein the backward and forward drive switching mechanism and the front wheel change speed gear mechanism encircle a longitudinal center line transversely of the transmission, and the first change speed gear mechanism, the second change speed gear mechanism and the third change speed gear mechanism are disposed in a region immediately forwardly of the backward and forward drive switching mechanism and the front wheel change speed gear mechanism.

5. A transmission as claimed in claim 3 wherein the clutch means includes a power takeoff line clutch and a propelling line clutch.

6. A transmission as claimed in claim 5 wherein
the first change speed gear mechanism includes a first group of drive gears fixed to a power takeoff line input shaft connected to an output end of the power takeoff line clutch, a first group of driven gears meshed with the first group of drive gears, respectively, and mounted for relative rotation on a first intermediate shaft extending parallel to the power takeoff line input shaft, and a first engaging means for selectively connecting the first group of driven gears to the first intermediate shaft;
the second change speed gear mechanism includes a second group of drive gears fixed to a propelling line input shaft connected to an output end of the propelling line clutch, a second group of driven gears meshed with the second group of drive gears, respectively, and mounted for relative rotation on a second intermediate shaft extending parallel to the propelling line input shaft, and a second engaging means for selectively connecting the second group of driven gears to the second intermediate shaft; and
the third change speed gear mechanism includes a third group of drive gears fixed to a third intermediate shaft operatively connected to the second change speed gear mechanism, a third group of driven gears meshed with the third group of drive gears, respectively, and mounted for relative rotation on a differential shaft extending parallel to the third intermediate shaft, and a third engaging means for selectively connecting the third group of driven gears to the differential shaft.

7. A transmission as claimed in claim 3 wherein the clutch means comprises a clutch operable to simultaneously establish and break a drive transmission to the power takeoff line and a drive transmission to the propelling line.

8. A transmission as claimed in claim 7 wherein
the first change speed gear mechanism includes a first group of drive gears fixed to an input shaft connected to an output end of the clutch, a first group of driven gears meshed with the first group of drive gears, respectively, and mounted for relative rotation on a first intermediate shaft extending parallel to the input shaft, and a first engaging means for selectively connecting the first group of driven gears to the first intermediate shaft;
the second change speed gear mechanism includes the first group of drive gears, a second group of driven gears meshed with the first group of drive gears, respectively, and mounted for relative rotation on a second intermediate shaft extending parallel to the input shaft, and a second engaging means for selectively connecting the second group of driven gears to the second intermediate shaft; and
the third change speed gear mechanism includes a second group of drive gears fixed to a third intermediate shaft operatively connected to the second change speed gear mechanism, a third group of driven gears meshed with the second group of drive gears, respectively, and mounted for relative rotation on a differential shaft extending parallel to the third intermediate shaft, and a third engaging means for selectively connecting the third group of driven gears to the differential shaft.

9. A tractor comprising;
an engine disposed in a front portion of the tractor,
a transmission case disposed in a rear portion of the tractor,
a pair of right and left chassis frames interconnecting the engine and the transmission case,
a step mounted on the chassis frames,
a transmission housed in the transmission case, said transmission including a first change speed gear mechanism for effecting change speed on a drive through a power takeoff line, a second change speed gear mechanism for effecting change speed on a drive through a propelling line, a third change speed gear mechanism for receiving the drive from the second change speed gear mechanism, and an input section for transmitting an output of the engine to the first and second change speed gear mechanisms, the input section including clutch means for establishing drive transmission, and
a transmission shaft for transmitting the output of the engine to the input section of the transmission,
wherein the first change speed gear mechanism, the second change speed gear mechanism and the third change speed gear mechanism encircle a longitudinal center line of the transmission.

10. A tractor as claimed in claim 9 wherein the clutch means includes a power takeoff line clutch and a propelling line clutch.

11. A tractor as claimed in claim 9 wherein the clutch means comprises a clutch operable to simultaneously establish and break a drive transmission to the power takeoff line and a drive transmission to the propelling line.

12. A tractor as claimed in claim 9 further comprising a hydraulic pump disposed in a region of the transmission and driven by a drive branched out of the input section of the transmission.

* * * * *